United States Patent
Chen et al.

(10) Patent No.: US 7,370,242 B2
(45) Date of Patent: May 6, 2008

(54) THERMAL MONITORING AND RESPONSE APPARATUS AND METHOD FOR COMPUTER UNIT

(75) Inventors: Chih-Yi Chen, San Jose, CA (US); Guohua Xiong, San Jose, CA (US); Muthukumar Ratty, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 529 days.

(21) Appl. No.: 11/135,053

(22) Filed: May 23, 2005

(65) Prior Publication Data

US 2006/0262474 A1    Nov. 23, 2006

(51) Int. Cl.
    G06F 11/00    (2006.01)
(52) U.S. Cl. .................... 714/47; 702/132; 700/300
(58) Field of Classification Search ................ 714/47; 702/130, 132; 700/299, 300; 374/141
    See application file for complete search history.

(56) References Cited

U.S. PATENT DOCUMENTS

| 5,333,676 | A |  | 8/1994 | Mizuno |
| 6,101,459 | A |  | 8/2000 | Tavallaci et al. |
| 6,134,667 | A | * | 10/2000 | Suzuki et al. ............... 713/300 |
| 6,487,463 | B1 | * | 11/2002 | Stepp, III .................... 700/79 |
| 6,647,321 | B2 | * | 11/2003 | Nagashima et al. ........ 700/300 |
| 6,654,894 | B2 | * | 11/2003 | Kaminski et al. ........... 713/300 |
| 6,702,665 | B1 |  | 3/2004 | Tai |
| 6,727,824 | B1 |  | 4/2004 | Miseli et al. |
| 6,927,961 | B2 | * | 8/2005 | Schestak ..................... 361/103 |
| 7,290,721 | B2 | * | 11/2007 | Cheng ........................ 236/49.3 |
| 2003/0135767 | A1 |  | 7/2003 | Chu et al. |
| 2003/0216882 | A1 | * | 11/2003 | Lai et al. .................... 702/132 |
| 2005/0216221 | A1 | * | 9/2005 | Broyles et al. ............. 702/132 |
| 2006/0010353 | A1 | * | 1/2006 | Haugh ......................... 714/47 |
| 2007/0150225 | A1 | * | 6/2007 | Boerstler et al. ........... 702/132 |

FOREIGN PATENT DOCUMENTS

DE            19531706         3/1997

OTHER PUBLICATIONS

PCT/US2006/019415, PCT International Search Report, dated Oct. 11, 2006.
Written Opinion of the International Searching Authority, dated Oct. 11, 2006.
J. Steele, "ACPI Thermal Sensing and Control in the PC", Wescon Conference, IEEE Center, Hoes Lane, US, pp. 169-182, Sep. 15, 1998.

* cited by examiner

Primary Examiner—Marc Duncan
(74) Attorney, Agent, or Firm—John R. Ley

(57) ABSTRACT

Thermal conditions within a computer unit are monitored. A system-level temperature sensor responds to intake cooling air. A subsystem-level temperature sensor responds to the temperature of a subsystem-level component, preferably a motherboard or a backplane. When the temperature sensed by of the system-level temperature sensor falls outside of a critical limit, it is determined whether the temperature sensed by the subsystem-level temperature sensor generally correlates with the temperature sensed by the system-level temperature sensor. If there is no correlation, the operation of the computer unit is continued.

25 Claims, 5 Drawing Sheets

THERMAL MONITORING AND RESPONSE APPARATUS AND METHOD FOR COMPUTER UNIT

This invention relates to computers and is particularly useful for computer units which are required to be continuously available to act on relatively massive, mission-critical data, such as network storage servers and enterprise servers. More particularly, the present invention relates to a new and improved apparatus and method for more reliably monitoring thermal conditions of the computer at the component, subsystem and system levels in such a way to detect legitimate abnormal thermal conditions and respond to protect the computer unit from damage while simultaneously recognizing false abnormal thermal conditions and responding by maintain full functionality of the computer unit rather than unnecessarily alarming, slowing or terminating operation of the computer unit under such false abnormal thermal conditions.

BACKGROUND OF THE INVENTION

Computer units generate heat as a result of conducting electrical currents within their various semiconductor integrated circuits, power supply and other internal components. The amount of heat generated and the criticality of that heat varies depending on the component. A central processing unit (CPU) generates considerable heat because of its very high frequency of operation and its continual operation. A CPU usually has its own directly attached heat sink to dissipate its heat. Other components, such as memory integrated circuits (ICs) generate more moderate amounts of heat, due to the more intermittent nature of the electrical currents they conduct. Generally speaking, less intensively used integrated circuits do not require separate heat sinks but are generally attached in groups to circuit boards or to a main circuit board called a motherboard. Other components within the computer unit enclosure may include backplanes, data transfer buses and specific devices connected to the data buses. Devices connected to the bus may generate significant heat. The power supply, which converts conventional AC power to DC power used by the computer components, is usually a significant source of heat.

The heat generated by the internal computer components must be removed. Otherwise, the components within the computer will degrade, their performance will become unreliable, and under extreme conditions the components will self-destruct. Consequently, computer units utilize cooling systems to remove the heat. The most prevalent type of cooling system is an air cooling system. Cooling air is drawn through a vent in an enclosure for the computer unit which surrounds and encases the computer components. One or more cooling fans or blowers draw in intake cooling air and force the cooling air through the enclosure and over the internal components of the computer unit. In some circumstances, the cooling fan or blower is integrated with the power supply. The heat sink attached to the CPU may have its own dedicated cooling fan to remove the higher concentration of heat generated by the CPU. The temperature of the cooling air has an effect on cooling the computer unit. A higher air temperature reduces the cooling effect.

Because of the critical need for cooling, modern computer units include a capability for monitoring thermal conditions. Temperature monitoring capability is particularly important for high-end servers because its reliability for communicating data is directly related to the operating temperature of its critical components. The the reliability of the servers internal components must be protected from harsh thermal conditions which might allow or cause its internal operating components to exceed their acceptable operating limits.

Higher performance computer servers typically employ multiple thermal sensors to assure reliable and safe operation. Critical components such as CPU's have a dedicated sensor embedded in their integrated circuitry for monitoring the die temperature during operation. At the subsystem level, such as on the motherboard, the backplane, any devices connected to an internal bus, and the power supply, on-board sensors monitor the local operating temperature of these components. Finally, at the system level, such as for the cooling air which flows through the enclosure, thermal sensors safeguard the overall system operating environment.

The conventional practice in monitoring the thermal conditions of computer units is straightforward in terms of making decisions based on the temperature signals supplied by the multiple thermal sensors. So long as the temperature indications fall within a normal operating range, the computer unit continues its operation in the normal way. However, if any one of the temperatures sensed exceeds the normal operating range, warnings are issued and/or the operation of the computer unit is shut down.

While the conventional practice is generally reliable in preventing damage to the computer unit, problems of reliability have arisen as a result of permitting each individual temperature sensor to control the continued operation of the computer unit. An intermittent or permanent sensor failure or malfunction cannot be accounted for, because the indications from each individual sensor have the capability of individually shutting down the computer unit. Individual sensor indications are not evaluated for accuracy or reliability. The chances of false decision-making are increased, with the result that the system performance is adversely affected by limiting or reducing system uptime and availability while increasing maintenance costs.

The degree of importance of the indications from the different sensors is not differentiated. For example, the CPU temperature and the intake cooling air temperature, when beyond limits, can create immediate and serious consequences. On the other hand, an occasional increase in temperature above the upper limits of less critical components can be more readily tolerated. Due to the unique airflow, thermal and fluid dynamic characteristics of each different computer unit and its use at different installation sites, the sensors will experience different temperatures. As a consequence, some of the sensors will be more prone to exceed normal operating ranges, while other sensors will be less prone to do so. The conventional practice does not recognize these significant differences.

These and other similar and related problems have led to system shut-downs, and the delivery of automatic support (ASUP) messages to system administrators to report abnormal operating conditions under circumstances where the thermal operating environment was within acceptable limits. Proper system operation and availability has been needlessly and adversely affected, and the costs associated with maintenance and monitoring of the computer unit have been unnecessarily increased, among other undesirable consequences.

SUMMARY OF THE INVENTION

The present invention uses multiple thermal sensors positioned strategically inside the enclosure of a computer unit to sense the temperature of the important heat-generating components and subsystems as well as the system itself. The indications from the sensors are interpreted and correlated to make reliable thermal response decisions without solely depending on the indications from individual sensors and on the individual limits for each of the sensors. The very important system-level responses are based on correlated consideration of the temperature indications from other sensors. The thermal condition of the entire computer unit is better evaluated and monitored during continuous operation. Occasional sensor errors are recognized as such to avoid unnecessary system shutdowns and slowdowns in operation and to avoid false warnings of impending problems, when actual problems do not exist or were transitory nature and have resolved themselves. Permanent sensor errors may still allow continued system operation under some circumstances if the correlated analysis of other temperature signals from other sensors indicate acceptable operating conditions. The technique is adaptable to the existing infrastructure of most computer units and their installation sites. Reliable system operation is assured, uptime is increased, and maintenance costs are reduced.

These and other aspects are achieved in a method of monitoring thermal conditions within a computer unit. The computer unit includes a system-level temperature sensor which responds to a temperature indicative of overall acceptable temperature conditions for the computer unit, such as cooling air temperature. At least one and preferably a number of subsystem-level temperature sensors respond to temperature conditions of subsystem-level components of the computer unit, such as a motherboard or a backplane. The monitoring method involves determining whether the temperature sensed by of the system-level temperature sensor falls outside of a critical limit, determining whether the temperature sensed by a subsystem-level temperature sensor generally correlates with the temperature sensed by the system-level temperature sensor when the temperature sensed by the system-level temperature sensor falls outside of a critical limit, and shutting down operation of the computer unit only upon recognizing a correlation between the temperature sensed by the subsystem-level temperature sensor and the temperature sensed by the system-level temperature sensor under circumstances where the temperature sensed by the system-level temperature sensor falls outside of the critical limit.

Other aspects of the invention relate to apparatus which monitors thermal conditions within a computer unit. A system-level temperature sensor supplies a temperature signal related to a temperature indicative of overall acceptable temperature conditions for the computer unit, and a subsystem-level temperature sensor which supplies a temperature signal related to a temperature condition of a subsystem-level components, such as a motherboard or a backplane. A memory stores values related to warning and critical limit thresholds for the temperature sensors. A processor executes instructional code defining a process flow to monitor thermal conditions in response to the temperature signals and their relationship to the warning and critical limits. The process flow determines whether the temperature signal from the system-level temperature sensor falls outside of the critical limit for the system-level temperature sensor, determines whether the temperature signal from the subsystem-level temperature sensor generally correlates with the temperature signal from the system-level temperature sensor when the temperature signal from the system-level temperature sensor falls outside of the critical limit, and commands shutting down operation of the computer unit only upon recognizing a correlation between the temperature signal from the subsystem-level temperature sensor and the temperature signal from the system-level temperature sensor when the temperature signal from the system-level temperature sensor falls outside of the critical limit for the system-level temperature sensor.

Preferred aspects of the method and apparatus of the invention include some or all of the following. The computer unit is shut down only after the temperature sensed by the system-level temperature sensor remains outside of the critical limit for a predetermined time. The operation of the computer unit is continued without shutting down if the temperature sensed by a sensor returns to an acceptable level within a predetermined time. A succession of values of the temperature sensed by a sensor are obtained when the sensed temperature falls outside of a limit. Response determinations are made based on whether a predetermined proportion of the successively obtained values fall outside of the critical limit. Normal, warning and critical limits are established for the temperature sensors. A change of state of the temperature sensed by a sensor initiates execution of the thermal monitoring in response process flow. In most cases, warning messages are sent before shutting down the computer, to permit evasive action to be taken before conditions reach a more serious point where shut down is required.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
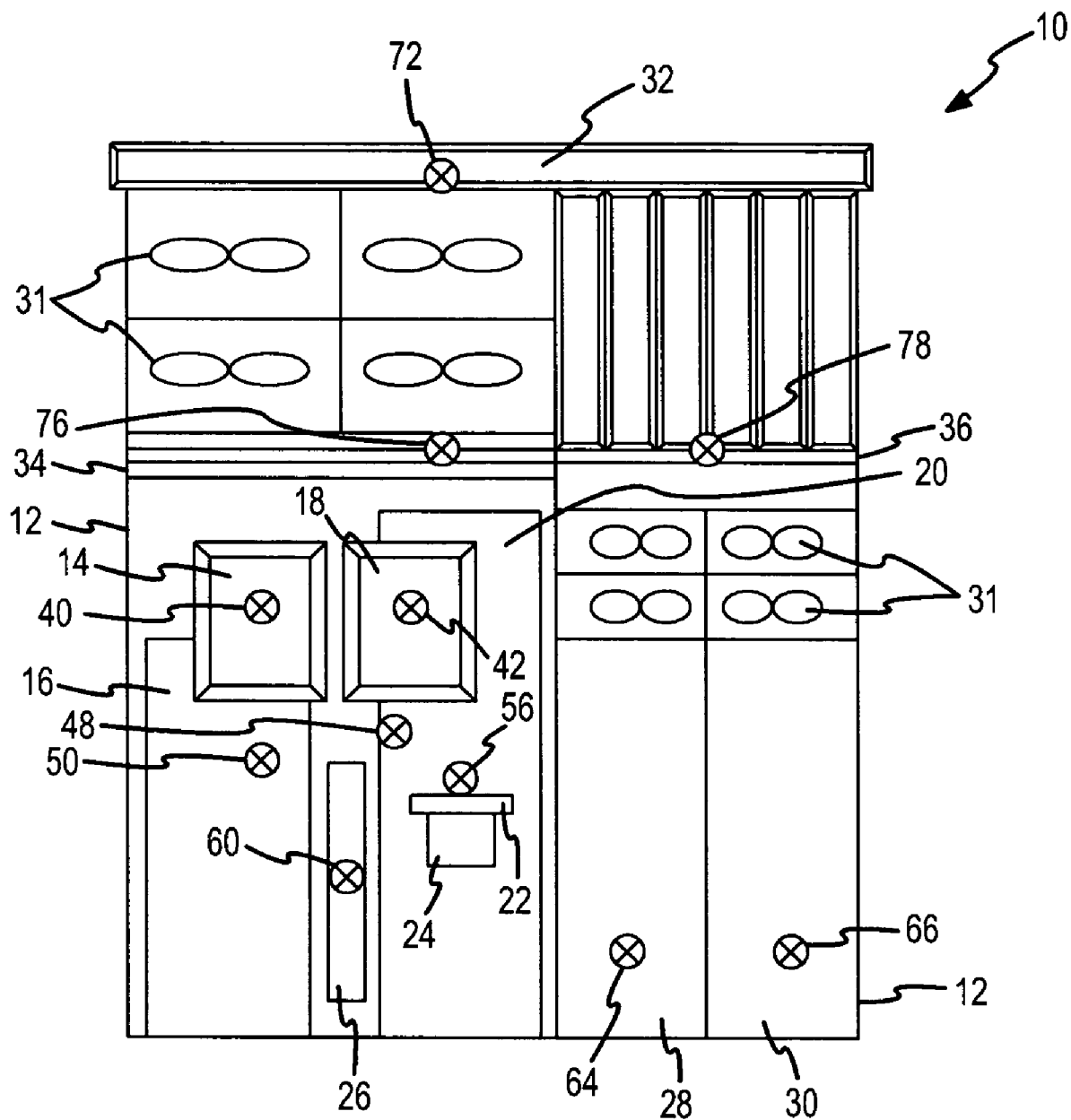
FIG. 1 is an illustration of a computer unit which generally illustrates a number of thermal temperature sensors located and associated with internal components of the computer unit.

Details of the present invention are illustrated in connection with a computer unit 10, such as a network storage server, shown in FIG. 1. The computer unit 10 includes an external case or enclosure 12 within which components of the computer unit 10 are located and housed. Those components include at least one central processing unit (CPU) 14 connected to or associated with a motherboard 16. Preferably, the computer unit 10 also includes a second CPU 18 which is connected to or associated with a second motherboard 20. Both CPUs 14 and 18 could be included on a single motherboard 16 or 20. One of the motherboards, for example motherboard 20, includes a data-transfer bus 22, such as a conventional PCI bus, to which there is connected a conventional bus device 24, such as a nonvolatile memory card, for example. The bus device 24 is added to or used in conjunction with the computer unit 10 on an optional basis. The bus device 24 may turn the computer unit 10 into a specific use computer, such as a network server and storage unit. Under such circumstances, the bus device 24 may contain program code and data stored in nonvolatile memory which is used to create the specific desired performance. A conventional remote LAN manager (RLM) device 26 may also be also present within the enclosure 12. The RLM device 26 is used to control the functionality of the computer unit 10 from a remote location over a local area network (LAN). At least one and preferably two power supplies 28 and 30 are also located within the enclosure 12.

At least one fan 31 or blower is included in the enclosure 12 for drawing intake cooling air into an inlet vent 32 in the front panel of the enclosure 12. The cooling air flows around all of the internal components and exits through one or more outlet openings (not shown) located in a back panel of the enclosure 12. In some circumstances, the cooling air fans or blowers may be made part of the power supplies 28 and 30. In other circumstances, such a shown in FIG. 1, each cooling fan 31 is a separate component within the computer unit 10. An adequate flow of cooling air through the enclosure 12 is critical to maintaining the internal components of the computer unit 10 within acceptable thermal limits for proper operation. Although air is preferred as the cooling medium for the type of computer unit described herein, liquid could also be employed as another cooling fluid in other types of computer units.

The internal components of the computer unit 10 are located and oriented within the enclosure 12 to achieve acceptable cooling from the internal airflow when the inlet vent 32 is not blocked to limit the intake cooling airflow and the temperature of the intake cooling air is within an acceptable range of temperature. With an adequate flow of air within an acceptable temperature range, the internal components of the computer unit 10 should not normally experience increased temperatures. However, monitoring for abnormal conditions is necessary to assure that the adequate cooling will actually be achieved.

At least one and preferably two conventional backplanes 34 and 36 are also present within the enclosure 12. One of the backplanes 34 or 36 is associated with each of the motherboards 16 or 18. The backplanes 34 and 36 are used to connect internal components of the computer unit 10 to the motherboards. The computer unit 10 may include other conventional and well-known internal components (not shown).

Figure 2:
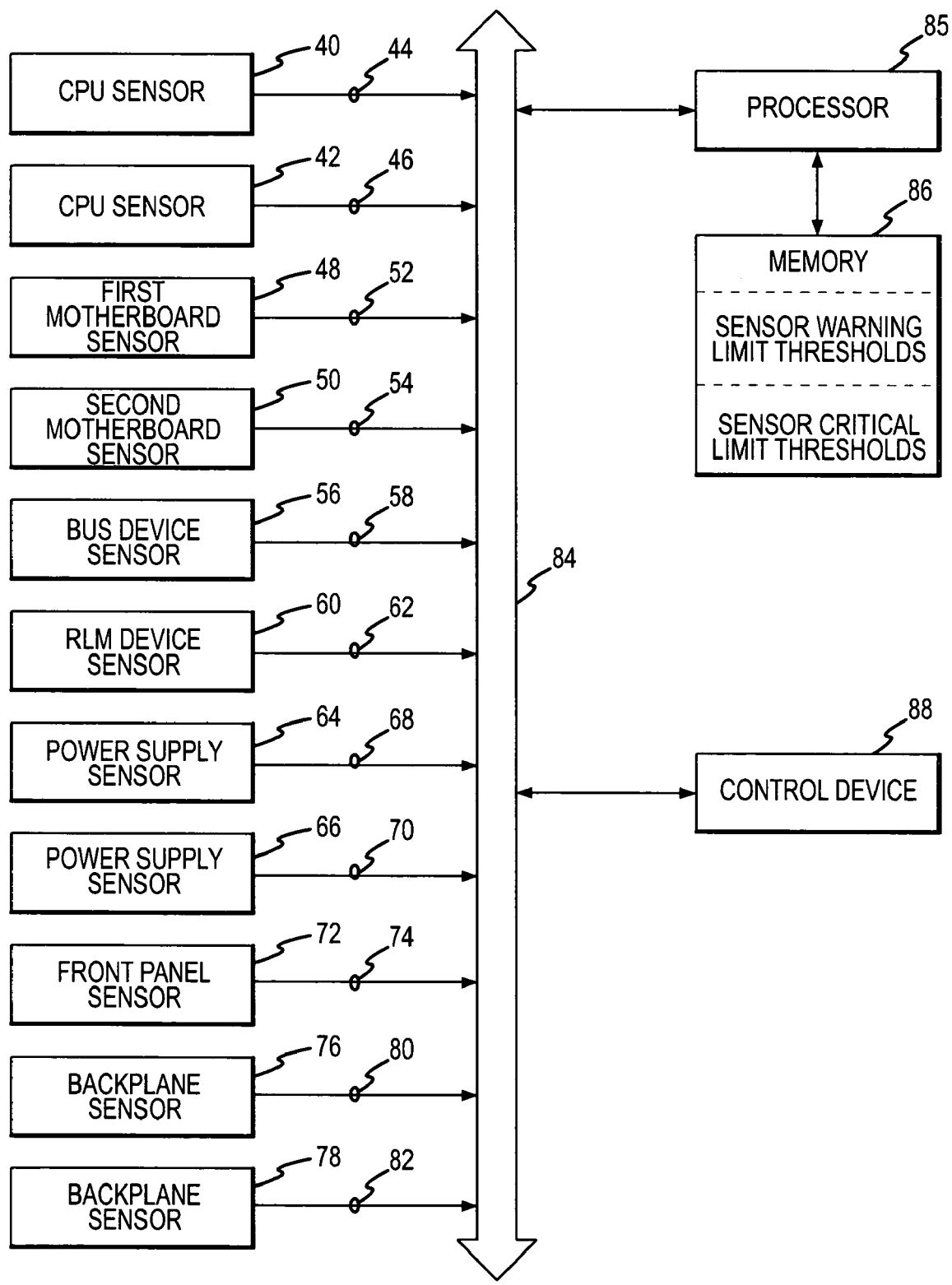
FIG. 2 is a block diagram of the temperature sensors shown in FIG. 1 and a processor and a memory which stores information defining warning limits and critical limits for the temperature sensors and which contains instructions for executing a thermal monitoring and response process flow according to the present invention.

Thermal sensors are thermally associated with the internal components of the computer unit 10, as shown in FIGS. 1 and 2. First and second die-level integrated circuit temperature sensors 40 and 42 are associated with the CPUs 14 and 18, respectively. The CPU temperature sensors 40 and 42 deliver signals 44 and 46 which are related to the temperatures of the CPUs 14 and 18, respectively. First and second motherboard sensors 48 and 50 are attached to or thermally associated with the motherboards 16 and 20, respectively. The motherboard sensors 48 and 50 supply motherboard temperature signals 52 and 54 which are generally indicative of the temperature of the motherboards 16 and 20, respectively. Although the CPUs 14 and 18 are attached to the motherboards 16 and 20, respectively, the temperatures of the CPUs 14 and 18 are generally more localized than the temperatures of the motherboards 16 and 20.

A single temperature sensor 56 is attached to or thermally associated with the bus device 24. The bus device sensor 56 supplies a bus device temperature signal 58 indicative of the temperature experienced by the bus device 24. A single RLM sensor 60 is attached to or thermally associated with the RLM device 26. The RLM device sensor 60 supplies a RLM temperature signal 62 which is related to the temperature of the RLM device 26 sensed by the sensor 60. Two power supply temperature sensors 64 and 66 are associated with the power supplies 28 and 30, respectively. The power supply sensors 64 and 66 supply power supply temperature signals 68 and 70 which are related to the temperatures of the power supplies 28 and 30, respectively.

A front panel temperature sensor 72 is located adjacent to the inlet vent 32 are other cooling air inlet. The front panel sensor 72 senses the temperature of the cooling air which enters the vent 32, and supplies a front panel temperature signal 74 representative of the temperature of the intake cooling air which enters the enclosure 12 (FIG. 1) through the inlet vent 32. The front panel sensor 72 is very important in monitoring the system level cooling of the entire computer unit 10, because the temperature of the cooling air entering through the vent 32 should determine the overall state of cooling within the computer unit. The temperature of the intake cooling air sensed by the front panel sensor 72 represents, in a single temperature measurement, the principal indication of the expected thermal condition of all of the internal components within the computer unit.

First and second backplane temperature sensors 76 and 78 are thermally associated with the backplanes 34 and 36, respectively. The sensors 76 and 78 sense the temperatures of the backplanes 34 and 36 and supply backplane temperature sensor signals 80 and 82 which are related to the temperatures of the backplanes 34 and 36, respectively. In some cases, the backplane temperature sensors 76 and 78 may be eliminated in favor of the motherboard temperature sensors 48 and 50, or alternatively, the backplane temperature sensors 76 and 78 may be used instead of the motherboard temperature sensors 48 and 50. These alternative arrangements are permitted because the backplanes are generally closely associated with the motherboards and will generally represent temperatures similar to the temperatures of the motherboards.

Other temperature sensors (not shown) may be thermally associated with other components (not shown) of the computer unit 10 to supply temperature signals related to the temperatures of the other components with which they are associated. Any other temperature sensors supply temperature signals in the same manner as the described sensors supply their temperature signals. Any other temperature sensors will be used with in accordance with the present invention in the same manner as the described temperature sensors, except the front panel sensor 72 which is dealt with separately as is described later.

As shown in FIG. 2, the temperature signals 44, 46, 52, 54, 58, 62, 68, 70, 74, 80 and 82 are supplied by the sensors 40, 42, 48, 50, 56, 60, 64, 66, 72, 76 and 78, respectively. The temperature signals are applied to an internal communication bus 84. Although not shown, conventional interface devices may be used to communicate the temperature signals from the sensors to the bus 84. A processor 85 is connected to the bus 84 to receive the temperature signals and to sample the temperature signals from those sensors. The functions of the processor 85 may be accomplished by one of the CPUs 14 or 18 (FIG. 1) in the other computer components associated with the CPUs. A memory 86 is directly connected to the processor 85. The memory 86 stores information which defines a high warning limit threshold, a low warning limit threshold, a high critical limit threshold and a low critical limit threshold for the temperature signals supplied by each of the sensors. The high warning limit threshold and the high critical limit threshold are used to evaluate over-temperature or high temperature conditions sensed by the sensors. The high critical limit threshold is greater in value than the high warning limit threshold. The low warning limit threshold and the low critical limit threshold are used to evaluate under-temperature or low temperature conditions sensed by the sensors. The low critical limit threshold is less in value than the low warning limit threshold. In this manner, protection for the computer unit is provided for over-temperature and under-temperature conditions. Although over-temperature conditions are the most typical concern because of their potential to permanently damage or destroy components of the computer unit, under-temperature conditions can cause erratic and unreliable performance in the considerable number of semiconductor devices within the computer unit, of which the CPUs are a primary example. The memory 86 also contains the necessary code for causing the processor 85 to execute the process flow for implementing the present invention.

The values for the warning and critical limit thresholds are established separately for each of the sensors based on comprehensive testing data obtained during thermal characterization of the computer unit 10 over a wide range of operating conditions, such as would be encountered in actual installations of the computer unit. The thermal characterization testing results in an ability to correlate the limit thresholds of all of the sensors relative to one another. The individual limit thresholds enable an evaluation of each individual temperature sensor signal as to whether it is reasonable and expected, and in relation to the temperature signals from the other sensors.

Another important advantage of the individual threshold limits and the ability to correlate the temperature sensor signals relative to their individual threshold limits and with respect to one another, is the avoidance of the somewhat erratic and conflicting information that results from relying solely on individual temperature sensor signals relative to individual uncoordinated limit thresholds. Uncoordinated limit thresholds from multiple sensors tend to create conflicting responses conditions, and generally result in a greater number of unnecessary alarm, slowdown and shut-down conditions. In general, the warning and critical limit thresholds are preprogrammed into the memory 86 during manufacturing and before delivering the computer unit 10 for commercial use, based on the thermal characterization of the computer unit.

The processor 85 constantly monitors each of the temperature signals and compares them to the warning and critical limit threshold values stored in the memory 86. A temperature sensor is determined to be in a warning state in an over-temperature condition if its temperature signal is between the high warning limit threshold and the high critical limit threshold. A temperature sensor is determined to be in a critical state in an over-temperature condition if its temperature signal is greater than the high critical limit threshold. A temperature sensor is determined to be in a warning state in an under-temperature condition if its temperature signal is between the low warning limit threshold and the low critical limit threshold. A temperature sensor is determined to be in a critical stage in an under-temperature condition if its temperature signal is less than the low critical limit threshold. A temperature sensor is in a normal state if its temperature signal is between the high warning limit threshold and the low warning limit threshold. The normal operating range of temperatures is therefore bounded at the upper end by the high warning limit threshold and that the lower end by the low warning limit threshold.

Any change in state of any temperature signal from any temperature sensor will trigger a required action to evaluate the situation and generate an appropriate response. The required action to be taken depends on the importance of the particular temperature sensor whose state has changed as well as its previous state and the state into which it has changed. The front panel sensor 72 is of predominant importance compared to the other sensors because all other sensors are affected by the temperature of the intake cooling air sensed by the front panel sensor 72. A high degree of confidence is required in the accuracy and long-term reliability of the front panel sensor 72.

The required action for changes in state of the front panel sensor is to send an auto support (ASUP) message upon changing into a warning state, and to shut down the computer unit upon changing into a critical state. The ASUP message is used to warn system administrators and maintenance personnel of an impending condition which may be detrimental to the continued performance of the computer unit. As another example of required action for a different sensor, an ASUP message will be issued if a power supply sensor changes into a warning state, but the computer unit will not be shut down or slowed down even if the power supply sensor changes into a critical state because the power supply can be protected by its own internal protection circuitry.

When the state of any of the sensors changes to a warning or critical state, the frequency of sampling its temperature signals is increased. The temperature signals from that sensor are sampled over a certain number of readings occurring within a certain amount of time and the effect of such sampling is averaged or proportioned. Averaging or proportioning permits an occasional abnormal reading to be ignored as an aberration. Only after the abnormal condition persists will that sensor be recognized as in a warning or critical state. If the front panel sensor is determined to be in a critical state and a selected subsystem level sensor also undergoes a change of state and indicates the same temperature trend as the front panel sensor, only then will the required action will be to shut down or slow down the computer unit.

As shown in FIG. 2, a control device 88 is connected to the bus to perform or execute the required action, such as shutting down the computer unit, or slowing it down, or possibly increasing the flow rate of airflow through the enclosure 12 created by the fan 31 or blower (FIG. 1). The control device 88 is controlled by signals delivered from the processor 85 over the bus 84.

Figure 3:
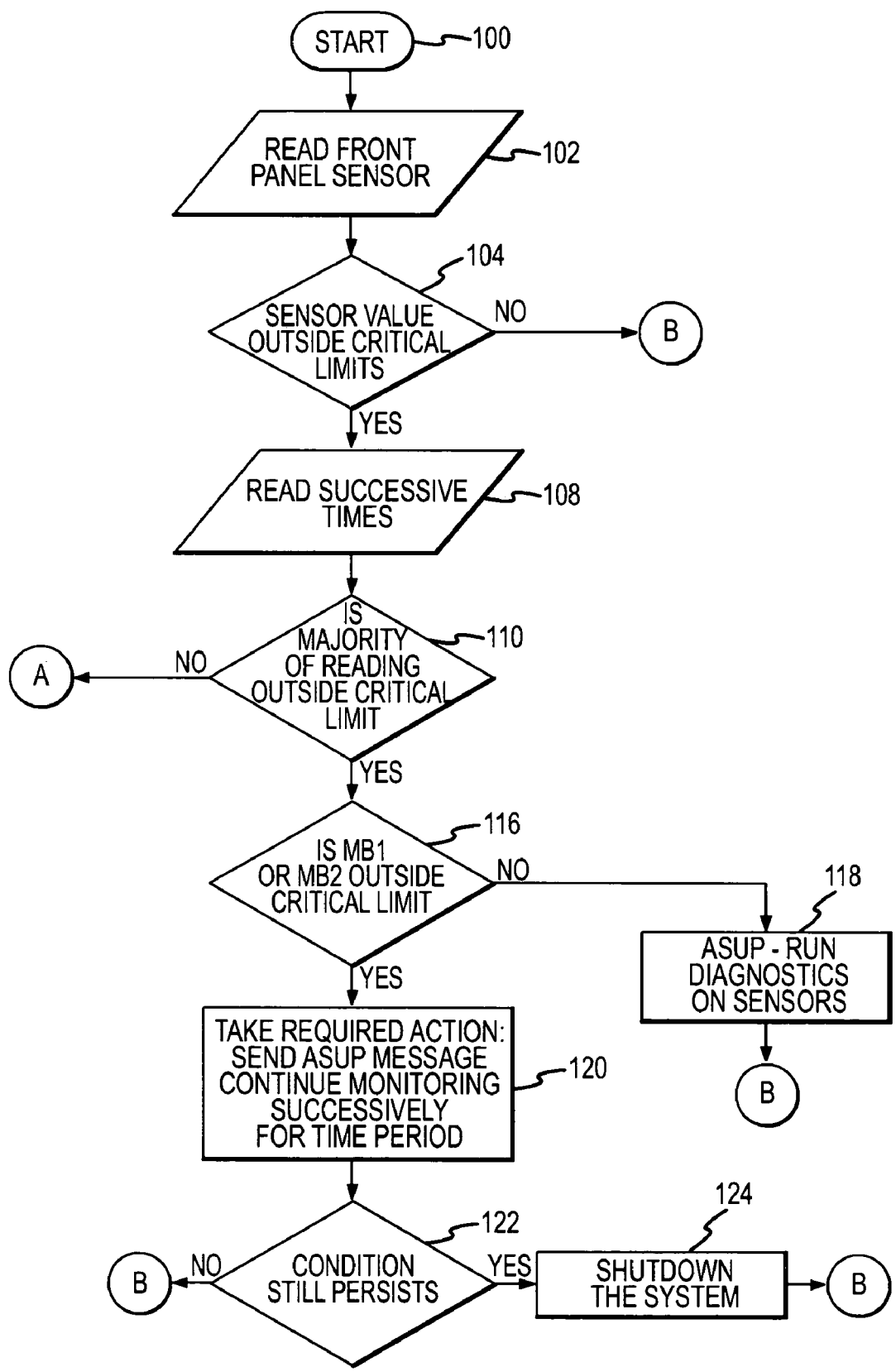
FIGS. 3 and 4 together form a single flowchart illustrating a process flow executed by the controller shown in FIG. 2 to monitor and respond to system-level temperature signals from a front panel sensor shown in FIGS. 1 and 2.
Figure 4:
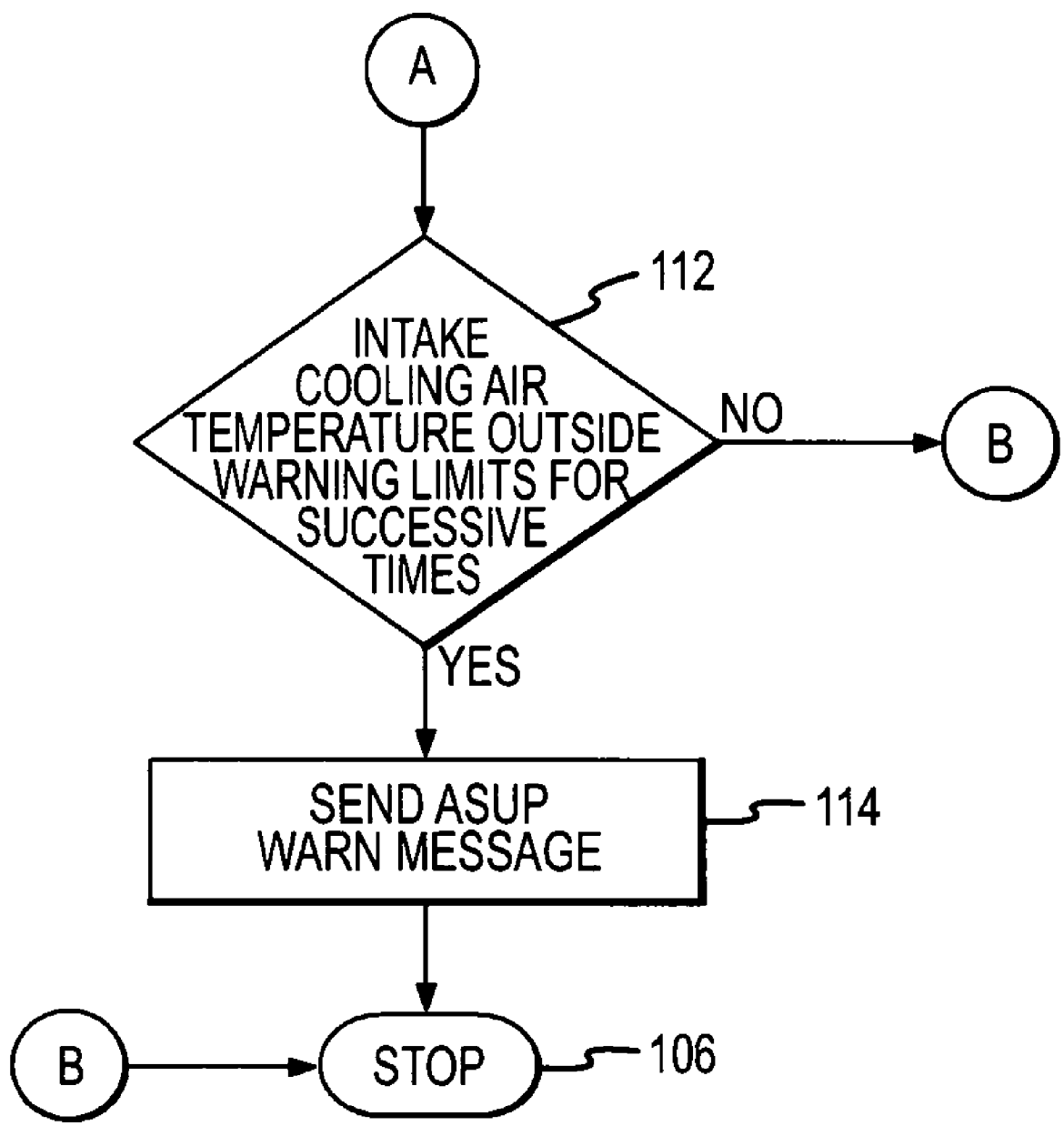
Figure 5:
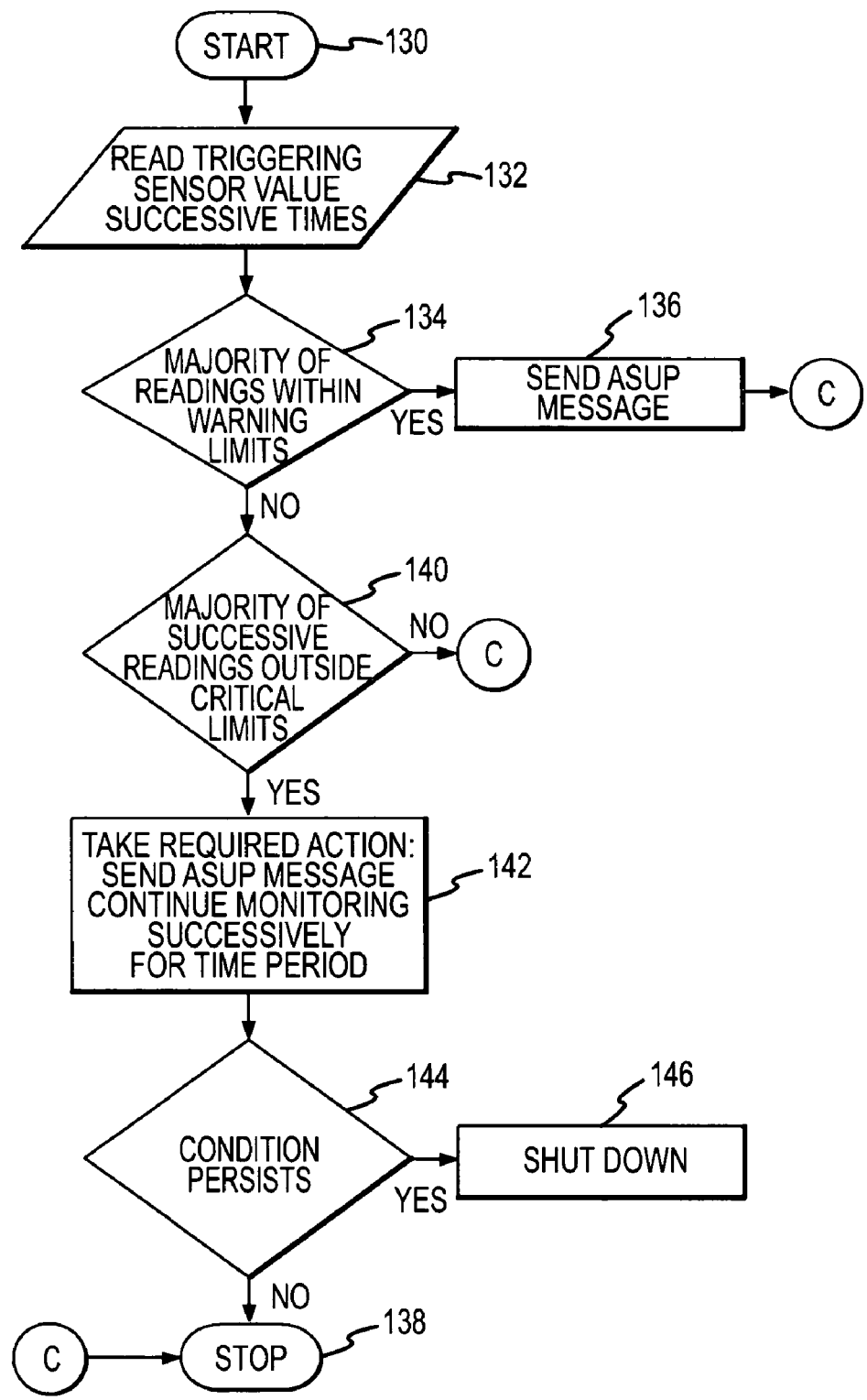
FIG. 5 is a flowchart illustrating a process flow executed by the controller shown in FIG. 2 to monitor and respond to temperature signals from the sensors shown in FIGS. 1 and 2 other than the front panel sensor.

A more detailed explanation of the process flow for implementing the present invention is shown by the flow charts of FIGS. 3-5. Each of the steps in the flow charts shown in FIGS. 3-5 is designated by a separate reference number. The starting and ending steps in the process flow define a single iteration of executing the process flow. The process flow is executed successively and continually during operation of the computer unit 10 in response to at least one of the described sensors changing state. The other reference numbers referred to in the description of the process flow associated with FIGS. 3-5 are to items of the computer unit 10 which have been previously described in conjunction with FIGS. 1-2.

The process flow for monitoring and responding to the very important, system-level thermal conditions is shown in FIGS. 3 and 4. The system level of thermal monitoring process flow focuses primarily on the front panel sensor 72, because it senses the temperature of the intake cooling air. It is essential that the intake cooling air fall within a desired temperature range because proper cooling of the internal components has been established based on that desired temperature range. The system-level of thermal monitoring process flow begins at 100 and moves to 102 where the temperature signal from the front panel sensor 72 is read or sampled. A determination is thereafter made at 104 whether the sampled front panel temperature signal falls outside of the critical limit thresholds. Falling outside of the critical limit threshold means that the front panel temperature signal is greater than the upper critical limit threshold or less than the lower critical limit threshold. If the determination at 104 is negative, a normal state or warning state of the front panel sensor 72 is indicated, and the process flow terminates at 106 as shown in FIG. 4.

A single instance of the front panel temperature sensor signal moving outside of the upper or lower critical limit thresholds will result in an affirmative determination at 104, indicating a critical state. Under such circumstances, the front panel temperature signal is sampled or read for a predetermined number of successive times, as shown at 108. Reading the temperature signal from the front panel sensor a successive number of times at 108 averages or proportions the readings to eliminate transitory and momentarily-erratic values. The averaging or proportioning reliably distinguishes between an actual and continuing increase in the temperature of the intake cooling air on one hand and one or a few erratic, transitory or anomalous temperature readings on the other hand.

The values successively sampled at 108 are evaluated at 110. If the majority or some other proportion of those values are not outside of the critical limit threshold (i.e., above the high critical limit threshold or below the low critical limit threshold), as represented by a negative determination at 110, it is assumed that the critical state of the front panel sensor is intermittent or occasional or that the temperature value represents a warning state and not a critical state. Under these circumstances the process flow advances to 112 (FIG. 4) where the determination of either of these two conditions is made.

At 112, the successive readings of the intake cooling air temperature made at 108 and which were averaged or proportioned at 110 are compared to the warning limit thresholds. If the averaged or proportioned readings are not outside of the warning limit thresholds (i.e., above the high warning limit threshold or below the low warning limit threshold), a normal state is indicated and the process flow terminates at 106. This circumstance would occur as a result of an occasionally erratic, transitory or aberrant reading from the front panel sensor 72 and represents a circumstance where the probability of an actual over-temperature or under-temperature problem is slight. The averaging and proportioning of the multiple successively-sampled front panel temperature sensor signals eliminates the effect of the occasionally erratic, transitory or aberrant reading.

On the other hand, if the determination at 112 indicates that the multiple successively-sampled front panel temperature signals indicate that the front panel sensor 72 is outside of the warning threshold limits, the front panel sensor is in a true warning state. Under these circumstances the intake cooling air has departed from its normal range of temperatures. This situation represents the possibility of a possibly more serious thermal condition if the temperature of the intake cooling air is not rectified. Thus, it is important to warn maintenance personnel of the impending condition, and an auto support (ASUP) message is sent at 114. The ASUP message sent at 114 indicates the need to correct problems with the intake cooling air to the computer unit and provides notice to appropriate maintenance personnel to take the necessary actions. After the ASUP message is delivered at 114, the process flow terminates at 106.

If the determination at 110 (FIG. 3) is affirmative, indicating that a majority of the front panel temperature sensor readings are outside of critical limits, there is an indication of a genuine over-temperature condition or there is an indication that the front panel sensor has failed. An affirmative determination at 110 advances the process flow to 116. The determination at 116 is intended to evaluate whether the front panel sensor has failed or whether a genuine overheating condition exists. These circumstances are evaluated by correlating the successively sampled and averaged or proportioned front panel temperature sensor information with temperature information obtained from one or more of the subsystem-level components within the computer unit 10. Preferably, the motherboard temperature signals are used for this correlation, but the backplane temperature signals are other suitable sub system-level temperature signals could also be employed, provided that those subsystem level component temperature signals can be reliably correlated with the temperature of the intake cooling air sensed by the front panel sensor 72.

The motherboard temperature signals 52 and 54 from the first and second motherboard sensors are evaluated at 116 to determine whether the motherboard temperature signals are outside of their critical limit thresholds. In this regard outside of their critical limit thresholds means that the motherboard temperature signals are greater than the high critical limit threshold or are less than the low critical limit threshold. If the motherboard temperature signals are outside of their critical limits, the motherboard temperature sensors are either in a normal state or in a warning state.

A negative determination at 116 constitutes a strong indication that the front panel sensor signal has failed. In general, the motherboard temperature signals correlate directly to the front panel temperature signal in such a way that all of the signals will change in a direct relationship if a legitimate over-temperature or under-temperature condition is encountered. The good correlation between the intake cooling air and motherboard temperatures remains evident under all operating conditions. A disagreement in this correlation, as determined by a negative determination at 116, indicates the possibility of a failed front panel sensor 72 or a failed motherboard sensor 48 are 50.

A negative determination at 116 indicates a need to perform a diagnostic check on all of the sensors, which is initiated at 118. The diagnostic check is a conventional procedure which evaluates the functionality of the sensors. Any abnormal functionality will be indicated as a result of running the diagnostic check at 118. Once the diagnostic check has been performed at 118, the process flow ends at 106 (FIG. 4).

If the motherboard temperature signals are indicated by an affirmative determination at 116 to be outside of the critical limit thresholds, i.e. in a critical state, there is good correlation between the temperature sensed by the front panel sensor and the motherboard sensors. This high degree of correlation indicates a genuine over-temperature condition caused by over-temperature or under-temperature intake cooling air. Under such circumstances, an ASUP message is sent and the front panel temperature is successively monitored for a relatively short extended time period, for example two minutes, as shown at 120. Continuing to monitor during the relatively short extended time period may provide an opportunity to determine whether the genuine overheating condition was transitory and resolved itself during the relatively short passage of time.

A negative determination at 122 indicates resolution of the transitory overheating condition, and results in terminating the process flow at 106 (FIG. 4). On the other hand, if the genuine over-temperature or under-temperature condition was not transitory, an affirmative determination at 122 indicates a need for immediate action to prevent damage to the internal components of the computer unit from the excess heat or to prevent erratic and unreliable performance due to the low temperature. An affirmative determination at 122 results in shutting down the computer unit at 124. Thereafter, because the computer unit has been shut down, the process flow terminates at 106 (FIG. 4).

In the manner described, the process flow associated with monitoring the the intake cooling air is correlated with the temperatures of sensed by the motherboard sensors (or other subsystem level component sensors). Correlating the intake cooling air temperature and the motherboard temperature provides a reliable basis for evaluating occasional, transient and malfunctioning conditions, as well as providing a reliable basis for evaluating genuine over-temperature or under-temperature conditions. Circumstances which indicate a probable, occasional or permanent failure of a sensor do not require shutting down or slowing down the computer unit. However, even under circumstances of an occasional false or erratic reading, or a permanent failure of a sensor, or under circumstances where the temperature may be approaching a critical limit, the ASUP signal is delivered to give maintenance personnel an early warning of an impending potentially serious situation, thereby providing opportunity to correct that situation before it is necessary to shut down or slow down the computer unit.

The process flow for evaluating the temperature sensed by the sensors within the computer unit 10 other than the front panel sensor 72, is shown in FIG. 5. The process flow shown in FIG. 5 is applicable to those subsystem level components and the individual devices are components within the computer unit 10. The other temperature sensor monitoring process flow is initiated in response to a change of state of one of these sensors.

The process flow begins at 130 with a change from the normal state to a warning or critical state. Upon the change of state, the temperature signal from the sensor which changes state is read or sampled successively multiple times as shown at 132. If a majority or predetermined proportion of the successively sampled temperature signals fall within the warning limit threshold, as indicated by an affirmative determination at 134, an ASUP message is sent at 136. Thereafter the process flow terminates at 138. A majority or predetermined proportion of the successively sampled temperature signals fall within the warning limit threshold when those signals represent values which are greater than the upper warning limit or which are less than the lower warning limit.

If the majority or predetermined proportion of the temperature signals sampled at 132 do not fall within the warning limit threshold, as indicated by a negative determination at 134, the program flow advances to 140. A negative determination at 140 indicates that the majority or proportion of the successive readings obtained at 132 indicate a normal state. Therefore, the change of state that initiated the process flow was a transient, erratic or aberrant condition. The process flow thereafter terminates at 138.

An affirmative determination at 140 indicates that the majority or proportion of the successive readings obtained at 132 fell within the critical limit thresholds. The affirmative determination at 140 therefore requires action with respect to the temperature sensed by a particular sensor. That action occurs at 142 by sending an ASUP message and by continuing to monitor the temperature signal successively for a relatively short extended time period, for example two minutes. Continuing to monitor during the relatively short time period may provide an opportunity to determine whether the over-temperature or under-temperature condition was transitory and was resolved due to the passage of the relatively short amount of time.

If the critical limit threshold condition persists, as determined at 144, the required action is to shut down the computer unit, as shown at 146. On the other hand, if the critical limit threshold condition was transient and resolved itself during the relatively short extended time period established at 142, the determination at 144 will be negative and the process flow will terminate at 138.

The process flow for evaluating the temperature signals from the temperature sensors at the component level and the subsystem level of the computer unit, shown in FIG. 5, makes advantageous use of the warning limit threshold to indicate a potential genuine over-temperature or under-temperature condition by the delivery of the ASUP message. However, before the ASUP message is delivered, a relatively short time is provided to permit any transitory or occasional temperature sensor values to clear. Moreover by responding to a majority of successively obtained temperature sensor values, an averaging or proportioning effect is achieved which also helps to eliminate erratic in transitory values and provide a more reliable overall indication of temperature. The delivery of the ASUP message when the temperature readings are reliably established as falling within the warning limit thresholds permits maintenance personnel to take early action to avoid the development of a more serious thermal condition. However, if a genuine over-temperature or under-temperature condition continues to be indicated, the computer unit is shut down.

The process flow shown in FIG. 5 for evaluating the temperatures of those subsystem-level and component level devices within the computer unit is used in conjunction with the system-level process flow shown in FIGS. 3 and 4, to provide reliable thermal monitoring and responses to genuine over-temperature or under-temperature conditions.

More reliable thermal monitoring within the computer unit is obtained at the system level, the subsystem level and the component level. The monitoring involves the selective and combined use of averaged or proportioned multiple temperature sensor values obtained successively when a change of state occurs. Transitory or erratic conditions are resolved without shutting down or slowing down the computer unit. For the most important system level temperature sensing of the intake cooling air temperature obtained by the front panel sensor, adverse indications are correlated with the temperatures of other subsystem level components to effectively recognize genuine over-temperature and under-temperature conditions from similar trends and temperatures of the sensors for the subsystem-level components. The correlation also permits occasional or permanent failures of sensors at the system and subsystem levels to be resolved without shutting down or slowing down the computer unit. Warning signals in the form of ASUP messages are sent at an early stage in the development of a potentially damaging thermal condition to allow maintenance personnel to take early preventative action before it is necessary to shut down or slow down the computer unit.

Unreliable, erratic or quickly transitory temperature sensor readings, drifts in the levels of the temperature sensor signals over time, and permanent hardware failures, are recognized and accommodated when possible. Unnecessary actions which adversely affect system operation can be avoided. Continued operation is permitted under non-critical conditions. Possible hardware failures can be identified under circumstances which may not require shutting down the computer unit. Actions which could interfere with the normal operations of the computer unit, such as slowing down the data processing rate, increasing the speed of the cooling fans are blowers, or even erratically shutting down the system can all be avoided. System performance is enhanced, overall system availability and reliability is increased, and maintenance costs are reduced. These and other advantages and improvements will be apparent upon gaining a complete understanding of the significance of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A method of monitoring thermal conditions within a computer unit which includes a system-level temperature sensor which responds to a temperature of intake cooling fluid for the computer unit and a subsystem-level temperature sensor which responds to a temperature condition of a subsystem-level component which is cooled by the cooling fluid within the computer unit, comprising:

determining whether the temperature sensed by of the system-level temperature sensor falls outside of a critical limit;

determining whether the temperature sensed by the subsystem-level temperature sensor generally correlates with the temperature sensed by the system-level temperature sensor when the temperature sensed by the system-level temperature sensor falls outside of the critical limit; and shutting down operation of the computer unit only upon recognizing a correlation between the temperature sensed by the subsystem-level temperature sensor and the temperature sensed by the system-level temperature sensor when the temperature sensed by the system-level temperature sensor falls outside of the critical limit.

2. A method as defined in claim 1, further comprising:

shutting down operation of the computer unit only after the temperature sensed by the system-level temperature sensor remains outside of the critical limit for a predetermined time.

3. A method as defined in claim 2, further comprising:

continuing operation of the computer unit without shutting down operation of the computer unit if the temperature sensed by the system-level temperature sensor returns to within the critical limit within the predetermined time.

4. A method as defined in claim 1, further comprising:

continuing operation of the computer unit without shutting down operation of the computer unit if the temperature sensed by the system-level temperature sensor fails to correlate with the temperature sensed by the subsystem-level temperature sensor when the temperature sensed by the system-level temperature sensor falls outside of the critical limit.

5. A method as defined in claim 4, further comprising:

performing a diagnostic evaluation of the temperature sensors if the temperature sensed by the subsystem-level temperature sensor fails to correlate with the temperature sensed by the system-level temperature sensor when the temperature sensed by the system-level temperature sensor falls outside of the critical limit.

6. A method as defined in claim 1, further comprising:

obtaining a succession of values of the temperature sensed by the system-level temperature sensor when the temperature sensed by of the system-level temperature sensor falls outside of the critical limit;

determining whether a predetermined proportion of the succession of values of the temperature sensed by the system-level temperature sensor fall outside of the critical limit; and evaluating whether to shut down operation of the computer unit upon the predetermined proportion of the succession of values of the temperature fall outside of the critical limit.

7. A method as defined in claim 6, further comprising:

continuing operation of the computer unit without shutting down operation of the computer unit if less than the predetermined proportion of the succession of values of the temperature sensed by the system-level temperature sensor fails to correlate with the temperature sensed by the subsystem-level temperature sensor when the temperature sensed by the system-level temperature sensor falls outside of the critical limit.

8. A method as defined in claim 7, wherein the intake cooling fluid is air and the system-level temperature sensor senses the temperature of the intake cooling air which flows through an enclosure of the computer unit, and the method further comprises:

determining whether the temperature of the intake cooling air is outside a predetermined warning limit but not outside of a predetermined critical limit which is beyond the predetermined warning limit; and sending a warning message if the temperature of the intake cooling air is outside of the warning limit but not outside of the critical limit.

9. A method as defined in claim 8, further comprising:

obtaining a succession of values of the temperature of the intake cooling air; and determining whether a predetermined proportion of the succession of values fall outside of the warning limit but not outside of the critical limit before sending the warning message.

10. A method as defined in claim 9, wherein the subsystem-level temperature sensor is a temperature sensor thermally associated with one of a motherboard or a backplane of the computer unit.

11. A method as defined in claim 1, wherein the computer unit includes a plurality of subsystem-level temperature sensors each of which is thermally associated with a different subsystem-level component of the computer system, and the method further comprises:

establishing a warning limit and a critical limit for the values of the temperatures sensed by each of the plurality of subsystem-level temperature sensors;

establishing each critical limit beyond each warning limit;

detecting a change of state upon the temperature sensed by one of any of the plurality of subsystem-level temperature sensors transitioning through one of the warning or critical limits;

obtaining a succession of values of the temperature sensed by the one subsystem-level temperature sensor for which the change of state has been detected;

determining whether a predetermined proportion of the succession of values obtained fall outside of the warning limit but not outside of the critical limit for that one subsystem-level temperature sensor; and sending a warning message when the succession of values obtained fall outside of the warning limit but not outside of the critical limit.

12. A method as defined in claim 11, further comprising:

determining whether a predetermined proportion of the succession of values obtained fall outside of the critical limit for that one subsystem-level temperature sensor; and sending a warning message if the succession of values obtained fall outside of the critical limit.

13. A method as defined in claim 12, further comprising:

continuing obtaining the succession of values of the temperature sensed by the one subsystem-level temperature sensor for which the warning message has been sent after sending the warning message; and shutting down operation of the computer unit if the succession of values obtained after sending the warning message remains outside of the critical limit for a predetermined period of time.

14. A method as defined in claim 13, wherein the system-level temperature sensor comprises an intake cooling air temperature sensor for sensing the temperature of cooling air flowing through an enclosure of the computer unit, and the plurality of subsystem-level temperature sensors include a temperature sensor for sensing the temperature of one of a motherboard or a backplane within the computer unit.

15. A method as defined in claim 14, further including at least one component-level temperature sensor which is thermally associated with a different component-level component of the computer system, component-level component including a central processing unit within the enclosure of the computer unit, the method further comprising:

performing the aforesaid steps applicable to the subsystem-level temperature sensors with respect to the component-level component temperature sensors.

16. A method as defined in claim 15, wherein the plurality of subsystem temperature level sensors include at least one temperature sensor for sensing the temperature of at least one of a bus device connected to a communication bus within the computer unit or a remote LAN management device within the computer unit.

17. A method as defined in claim 1, wherein the system-level temperature sensor is a sensor for sensing the temperature of intake cooling air flowing into an enclosure of the computer unit for cooling components of the computer unit, and the subsystem-level temperature sensor is a temperature sensor thermally associated with one of either a motherboard or a backplane of the computer unit.

18. An apparatus of monitoring thermal conditions within a computer unit which includes at least one of a motherboard or a backplane, comprising:

a system-level temperature sensor which supplies a temperature signal related to a temperature representative of intake cooling fluid for the computer unit;

a subsystem-level temperature sensor which supplies a temperature signal related to the temperature of one of either the motherboard or the backplane;

a memory storing values of warning limit thresholds and critical limit thresholds for the system-level temperature sensor and the subsystem-level temperature sensor, the critical limit threshold for each temperature sensor being beyond the warning limit threshold for that temperature sensor;

a processor connected to the memory and receptive of the temperature signals supplied by the system-level and subsystem-level temperature sensors, the processor executing code defining a process flow for monitoring thermal conditions of the computer unit in response to the temperature signals, and the code executed by the processor:

determines whether the temperature signal from the system-level temperature sensor falls outside of the critical limit threshold for the system-level temperature sensor;

determines whether the temperature signal from the system-level temperature sensor generally correlates with the temperature signal from the subsystem-level temperature sensor when the temperature signal from the system-level temperature sensor falls outside of the critical limit threshold; and commands shutting down operation of the computer unit only upon recognizing a correlation between the temperature signal from the subsystem-level temperature sensor and the temperature signal from the system-level temperature sensor when the temperature signal from the system-level temperature sensor falls outside of the critical limit threshold for the system-level temperature sensor.

19. An apparatus as defined in claim 18, wherein the code executed by the processor:

commands shutting down operation of the computer unit only after the temperature sensed by the system-level temperature sensor remains outside of the critical limit threshold for a predetermined time.

20. An apparatus as defined in claim 1, wherein the code executed by the processor:

obtains a succession of values of the temperature sensed by the system-level temperature sensor when the temperature sensed by the system-level temperature sensor falls outside of the critical limit threshold;

determines whether a predetermined proportion of the succession of values of the temperature sensed by the system-level temperature sensor fall outside of the critical limit threshold; and commands shutting down operation of the computer unit upon the predetermined proportion of the succession of values obtained fall outside of the critical limit threshold.

21. An apparatus as defined in claim 20, wherein:

the cooling fluid is air;

the system-level temperature sensor is an intake cooling air temperature sensor for sensing the temperature of cooling air flowing through an enclosure of the computer unit; and the computer unit includes a plurality of subsystem-level temperature sensors each of which is thermally associated with a different subsystem-level component of the computer unit; and the code executed by the processor:

recognizes a change in state of the temperature sensed by one of the temperature sensors upon the temperature from that sensor transitioning through the warning limit threshold or the critical limit threshold;

detects a change of state of the temperature sensed by one of any of the plurality of subsystem-level temperature sensors;

obtains a succession of values of the temperature sensed by the one subsystem-level temperature sensor for which the change of state has been detected;

determines whether a predetermined proportion of the succession of values of the temperature sensed by the one subsystem-level temperature sensor fall outside the warning limit but not outside of the critical limit for that one subsystem-level temperature sensor; and commands the delivery of a warning message when the succession of values of the temperature sensed by the one subsystem-level temperature sensor fall outside of the warning limit but not outside of the critical limit.

22. An apparatus as defined in claim 21, wherein the code executed by the processor:

determines whether a predetermined proportion of the succession of values of the temperature sensed by the one subsystem-level temperature sensor fall outside of the critical limit for that one subsystem-level temperature sensor; and commands the delivery of a warning message if the succession of values of the temperature sensed by the one subsystem-level temperature sensor fall outside of the critical limit.

23. An apparatus as defined in claim 22, wherein the code executed by the processor:

commands shutting down operation of the computer unit after the temperature sensed by the one subsystem-level temperature sensor remains outside of the critical limit for a predetermined period of time.

24. An apparatus as defined in claim 23, wherein:

the computer unit further includes at least one component-level of temperature sensor which is thermally associated with a central processing unit (CPU) for sensing the temperature of a central processing unit within the enclosure of the computer unit.

25. An apparatus as defined in claim 24, wherein:

the plurality of subsystem temperature level sensors further include at least one of a temperature sensor for sensing the temperature of a bus device connected to a communication bus within the computer unit or a remote LAN management device within the computer unit.

* * * * *